Patented Jan. 24, 1950

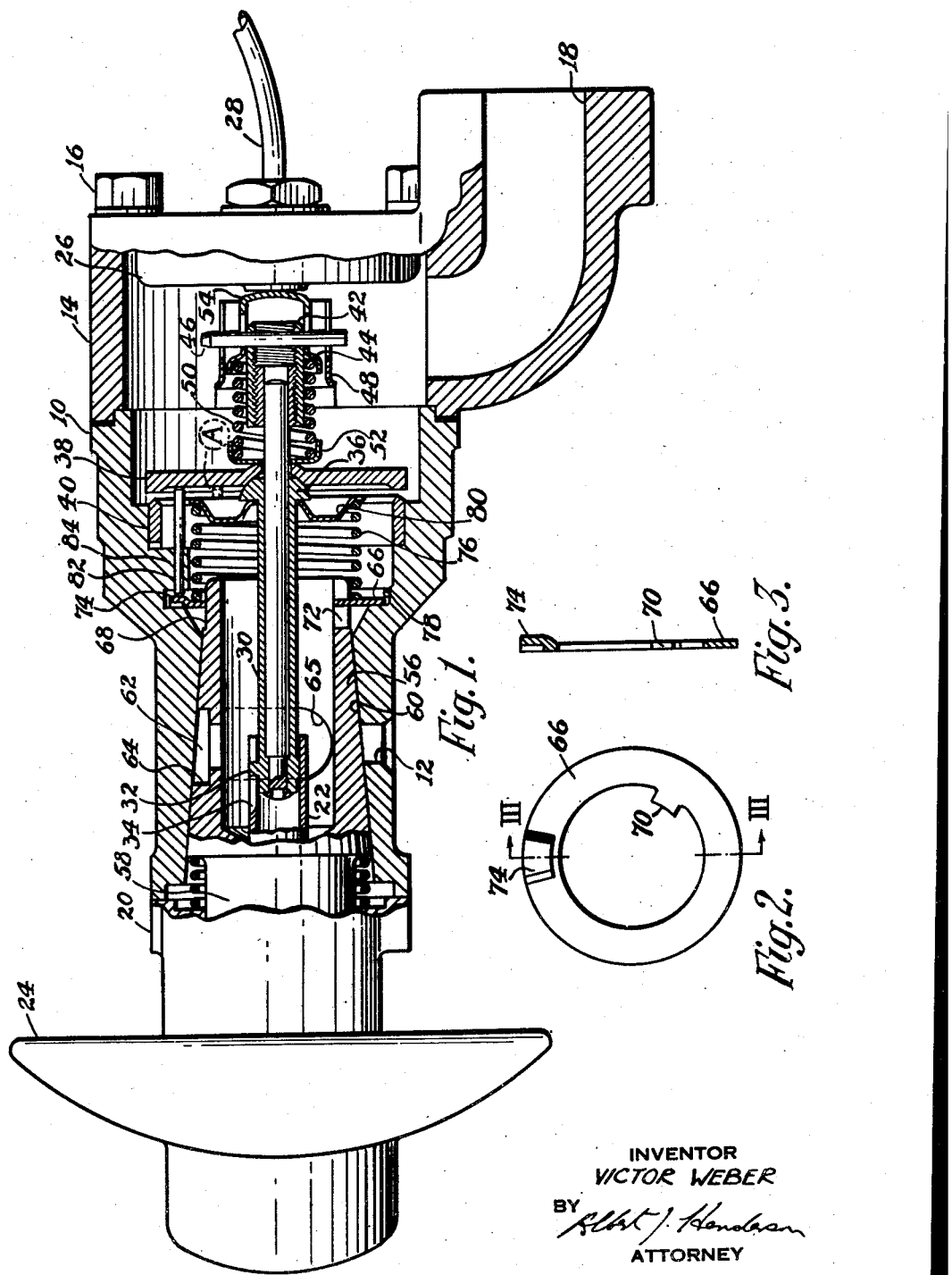

2,495,398

UNITED STATES PATENT OFFICE 2,495,398

VALVE

Victor Weber, Greensburg, Pa., assignor to Robertshaw-Fulton Controls Company, a corporation of Delaware Application November 4, 1944, Serial No. 561,878

2 Claims. (Cl. 277—24)

This invention relates to valves and, more particularly, to multiple valves depending upon a movement of one to effect movement of another. The invention is particularly applicable, although not limited, to the combination of a rotary shut-off cock and a reciprocable disc valve wherein rotation of the cock operating handle causes the disc valve to be lifted off its seat.

This combination finds a field of usefulness in thermostatic controls for gaseous fuel burners as the disc valve lends itself to operation between open and closed positions by the thermostat which thereby controls the flow of fuel to the burner to maintain a desired temperature. Controls of this general type are disclosed in Weber Patent No. 2,303,011 and Newell Patent No. 2,307,636 to which reference will be made hereinafter.

It has been found that the gaseous fuel supplied to consumers in certain localities is apt to leave a gummy or tarry deposit on metal surfaces and particularly on the disc and seat of the thermostatic valve. When the valve is left in closed position during a period of non-use of the control, the gummy substance hardens and causes the valve member to adhere to its seat with great tenacity. It thus becomes difficult to open the valve upon rotation of the cock handle without damage to the connecting parts.

An object of this invention is to prevent adherence of a disc valve member to its seat.

Another object of the invention is to utilize the movement of one member of a multiple valve assembly to eliminate the possibility of another member thereof adhering tenaciously to its seat.

Another object of the invention is to remove the liability of damage to the valve parts by automatic means requiring no attention on the part of the operator.

Another object of the invention is to retain the normal mode of operation and the existing type of construction in combined shut-off and thermostatic valves while promoting ease of manipulation and extending the useful life thereof.

Other objects and advantages will become apparent from the following description taken in connection with the accompanying drawing, wherein:

Fig. 1 is a front elevation, partly in section, of a combined shut-off and thermostatic valve embodying the invention;

Fig. 2 is a front elevation of a detail; and

Fig. 3 is a section taken on the line III—III of Fig. 2.

Referring more particularly to the drawing, the valve includes a main casing 10 provided with an inlet 12 for fluid fuel, such as gas, and having an end casing 14 detachably secured thereto as by means of the screws 16. The end casing 14 is provided with an outlet 18 for the fluid which flows from the inlet 12 through both casings. At the opposite end of the main casing 10 is a spud-piece 20 forming a support for an operating shaft 22 carrying the usual dial or operating handle 24.

Housed within the end casing 14 is the thermal control structure which may comprise an expansible power element 26, a capillary tube 28 and the usual bulb (not shown) which is located at the point where the temperature is to be controlled. This structure is filled with a liquid which upon an increase in the temperature sensed by the bulb will serve to expand the power element 26 as is well known to those skilled in the art.

The operating shaft 22 is suitably bored to receive the end of a valve shaft 30 which is adapted for longitudinal movement therein and is prevented from relative rotation by means of a driving pin 32 projecting therefrom into engagement with the walls of a slot 34 formed at the end of the operating shaft 22. The valve shaft 30 is provided intermediate its ends with an enlarged portion 36 which engages with a disc valve member 38. Movement of the disc valve member 38 away from its seat 40 occurs upon clockwise rotation of the shaft 30 due to the provision of a nut 42 which engages with a threaded end 44 formed on the end of the operating shaft 30 which projects through the valve member 38.

As fully described and claimed in the aforesaid Newell patent the nut 42 is held against rotation in the end casing 14 by a pin 46 which extends into suitable slots formed in a guide member 48 which is anchored in the casing 14. A coil spring 50 engaging at one end with a washer 52 and at the other end with a cap member 54 serves to bias the valve member 38 into engagement with its seat 40 and also compensates for overshoot action on the part of the thermal control structure.

The passage of fuel from the inlet 12 is controlled by a rotary shut-off cock 56 having an operating stem 58 by means of which the cock 56 may be rotated in a tapered seat 60 therefor formed in the main casing 10. The cock 56 is hollow and is provided with a port 62 formed by an arcuate groove 64 in the wall thereof which connects a pair of oppositely disposed apertures 65 in the wall. Thus, the port 62 is in registry with the inlet opening 12 throughout an arc of rotation of the cock sufficient to maintain the open or on position in various settings of the dial 24 corresponding to different temperatures to be maintained by the thermostatic control structure. Sufficient land or ungrooved surface is present on the cock wall to provide a closed or an off position when the port 62 is out of registry with the inlet 12.

This invention is more particularly directed toward means to prevent the disc valve member 38 from adhering to its seat 40. To this end, means are provided for holding the valve member 38 away from its seat 40 whenever the shut-off cock 56 is rotated to the off position.

The means for accomplishing this function may consist of a simple valve lifting device effective in only one position of the shut-off cock 56. In this embodiment, this means takes the form of a cam element 66 which is shown more clearly in Figs. 2 and 3 of the drawing. The cam element 66 is preferably annular for mounting on a cylindrical portion 68 of the shut-off cock 56 projecting toward the valve member 38. Relative rotation between the cam element 66 and the shut-off cock 56 is prevented by interlocking means therebetween in the form of a tang 70 formed on the inner periphery of the cam element 66 and projecting within a suitable slot 72 formed in the cylindrical portion 68 of the cock. The cam element 66 is further provided with a cam portion 74 on one face thereof which projects toward the valve member 38 from the otherwise flat body portion of the cam element.

A coil spring 76 engages the cam element 66 at one end and yieldably holds it in engagement with the wall of an annular recess 78 formed in the casing 10 opposite the cylindrical portion 68 of the cock. The opposite end of the coil spring 76 engages with a spring plate 80 which is preferably dished in cross section and mounted on the valve shaft 30 abutting the enlarged portion 36 thereof. The coil spring 76 is thereby adapted to hold the enlarged portion 36 in sealing engagement with the valve member 38 in accordance with the teaching of the aforesaid Newell patent.

Extending between the valve member 38 and the cam element 66 is a tappet 82 mounted for reciprocation in a lug 84 formed interiorly on the casing 10. It will be understood that the relative position of the valve lifting parts described are such that the cam portion 74 engages the tappet 82 only when the shut-off cock 56 is in off position. Such arrangement will necessitate a relative positioning of the slot 72 and port 62 in the shut-off cock together with the tang 70, cam 74 and tappet 82. It will further be apparent that the relative positions of the parts shown in Fig. 1 are somewhat distorted for the purposes of clarity in illustration and that the tappet 82, for example, would be located substantially in the broken line position "A" instead of that illustrated when the cock is in the off position shown.

In the operation of the device, the dial 24 is rotated clockwise to any desired setting which rotation will serve to move the threaded end 44 of the valve shaft 30 longitudinally into the nut 42. The coil spring 50 is thus compressed to some extent and the coil spring 76 is expanded as the enlargement 36 causes the valve member 38 to move away from its seat 40 while the power element 26 remains fixed. The rotation of the dial 24 causes the rotary shut-off cock 56 to be positioned with the port 62 in registry with the inlet 12 whereupon fuel may flow past the disc valve member 38 to the outlet 18. The outlet 18 may be connected to a burner (not shown) which is ignited to heat the compartment where the bulb of the thermal control structure is housed.

When the temperature of the compartment as sensed by the bulb portion reaches that for which the dial 24 has been set, the power element 26 will expand forcing the cap member 54 to the left as viewed in the drawing. Due to the fact that the spring 50 is stronger than the spring 76, the latter will be compressed as the valve member 38 moves toward its seat under this thermostatic control. When the temperature again falls below that for which the valve 24 has been set, the power element 26 will contract causing the valve member 38 to move away from its seat 40 under the bias of the spring 76 which acts in opposition to the expanding movement of the power element 26. Such movement of the disc valve member 38 toward and away from its seat may continue as long as the dial 24 remains as set with the cock in the on position.

When the dial 24 is rotated counter-clockwise to bring the port 62 of the shut-off cock 56 out of registry with the inlet 12, that is, the off position, the threaded end 44 of the valve shaft 30 is moved longitudinally to the left in the nut 42 thus permitting the coil spring 50 to move the valve 38 toward its seat 40 against the bias of the coil spring 76. However, this movement is limited by the tappet 82 which now is engaged by the cam portion 74 of the cam element 66 and is thus held in its extended position. As the opposite end of the tappet 82 engages with the valve member 38 this member is held away from its seat 40 against the bias of the spring 50 during the entire period that the shut-off cock is in its off position.

It is apparent that due to this improvement the adherence of the valve member 38 to its seat 40 is positively prevented whether or not gummy or tarry substances are formed on these elements. There is no interference with the normal operation of the multiple valve construction disclosed by the valve lifting device as this operates only when the shut-off cock is in the off position and the flow of fluid is cut off. Damage to the parts of the valve construction are prevented as the valve member cannot adhere to its seat during a period of non-use of the control and it can only contact its seat when the control is in normal operation.

It will be understood that many changes can be made in the arrangement and combination of parts and in the details of construction herein disclosed within the scope of the appended claims without departing from the spirit of the invention.

I claim:

1. In a multiple valve, a casing having an inlet and an outlet opening, a shut-off cock rotatable in said casing and having a port adapted to be moved upon rotation of said cock into and out of registry with said inlet opening to establish on and off positions, a disc valve member adapted for reciprocation in said casing toward and away from its seat for controlling said outlet opening and being biased toward said seat, means operable for overcoming said bias and positioning said valve member relative to its seat upon movement of said cock between said positions and including yieldable means for biasing said valve member away from its seat, a rotatable element having a portion engageable with said cock and positioned in said casing by said yieldable means, and interengaging means associated with said element and said valve member and effective when said cock is moved to one of said positions for holding said valve member away from its seat.

2. In a multiple valve, a casing having an inlet and an outlet opening, a shut-off cock rotatable in said casing and having a port adapted to be moved upon rotation of said cock into and out of registry with said inlet opening to establish on and off positions, a disc valve member adapted for reciprocation in said casing toward and away from its seat for controlling said outlet opening and being biased toward said seat, means operable for overcoming said bias and positioning said valve member away from its seat upon movement of said cock to said on position and including yieldable means for biasing said valve member away from its seat, a rotatable element mounted on said cock and positioned in said casing by said yieldable means, interlocking means between said element and cock for preventing relative rotation therebetween, a cam portion on said element projecting toward said valve member, and a tappet mounted in said casing and movable by said cam portion into operative engagement with said valve member, said cam portion and tappet being effective when said cock is in said off position for holding said valve member away from its seat.

VICTOR WEBER.

REFERENCES CITED

The following references are of record in the file of this patent:

UNITED STATES PATENTS

| Number | Name | Date |
|---|---|---|
| 1,078,420 | Davies | Nov. 11, 1913 |
| 1,784,705 | Olsen | Dec. 9, 1930 |
| 1,926,533 | Grayson | Sept. 12, 1933 |
| 1,989,722 | Toelle | Feb. 5, 1935 |
| 2,297,718 | Ray | Oct. 6, 1942 |
| 2,303,011 | Weber | Nov. 24, 1942 |
| 2,313,890 | Ray | Mar. 16, 1943 |